United States Patent
Saugnac et al.

(10) Patent No.: US 9,424,542 B2
(45) Date of Patent: Aug. 23, 2016

(54) DEVICE FOR COMMUNICATING BETWEEN AIRCRAFT FLIGHT PERSONNEL AND THE GROUND, AND METHOD IMPLEMENTING SAID DEVICE

(75) Inventors: Frederic Saugnac, Toulouse (FR); Valerie Renauldon-Dumain, Aussonne (FR)

(73) Assignee: AIRBUS CORPORATION, Toulouse (FR)

( * ) Notice: Subject to any disclaimer, the term of this patent is extended or adjusted under 35 U.S.C. 154(b) by 0 days.

(21) Appl. No.: 13/060,873

(22) PCT Filed: Aug. 7, 2009

(86) PCT No.: PCT/FR2009/000990
§ 371 (c)(1),
(2), (4) Date: Jun. 15, 2011

(87) PCT Pub. No.: WO2010/023372
PCT Pub. Date: Mar. 4, 2010

(65) Prior Publication Data
US 2011/0288759 A1    Nov. 24, 2011

(30) Foreign Application Priority Data

Aug. 26, 2008 (FR) ........................ 08 04691
Feb. 24, 2009 (FR) ........................ 09 00838

(51) Int. Cl.
*G06Q 10/06* (2012.01)

(52) U.S. Cl.
CPC ..................... *G06Q 10/06* (2013.01)

(58) Field of Classification Search
USPC ........... 340/313, 945, 963, 995.14; 342/455; 343/837; 370/316, 325, 328; 455/3.06, 455/3.01, 414.1, 431, 507, 519, 66.1, 98; 700/3; 701/14, 2, 3, 4, 528, 124; 704/246; 705/5, 16

See application file for complete search history.

(56) References Cited

U.S. PATENT DOCUMENTS

| 4,642,775 A | * | 2/1987 | Cline et al. ................... 701/528 |
| 5,714,948 A | * | 2/1998 | Farmakis et al. ............. 340/961 |

(Continued)

FOREIGN PATENT DOCUMENTS

| WO | 2006 086259 | 8/2006 |
| WO | 2008 033534 | 3/2008 |

OTHER PUBLICATIONS

McConnell, V. P., "Wireless Gatelink: Coming Of Age Ground-Based Aircraft Communications are Helping Carriers Like JetBlue And Fedex Operate Efficiently", Avionics Magazine, Internet Citation, Retrieved from the Internet: URL: http: // www.aviationtoday.com/print/av/categories/commercial/996.html>, Total pp. 3, XP002524530 (Jul. 1, 2005).

(Continued)

*Primary Examiner* — Jelani Smith
(74) *Attorney, Agent, or Firm* — Oblon, McClelland, Maier & Neustadt, L.L.P.

(57) ABSTRACT

A system for communicating between a commercial aircraft and the base of the airline that chartered the same when the aircraft is itself located on the ground during the flight preparation phases and before unloading the commercial freight or passengers. A method implements such a communication system by the commercial flight staff and/or the aircraft captain to prepare a flight and the commercial freight unloading phase.

15 Claims, 1 Drawing Sheet

(56) References Cited

U.S. PATENT DOCUMENTS

Figure 1:
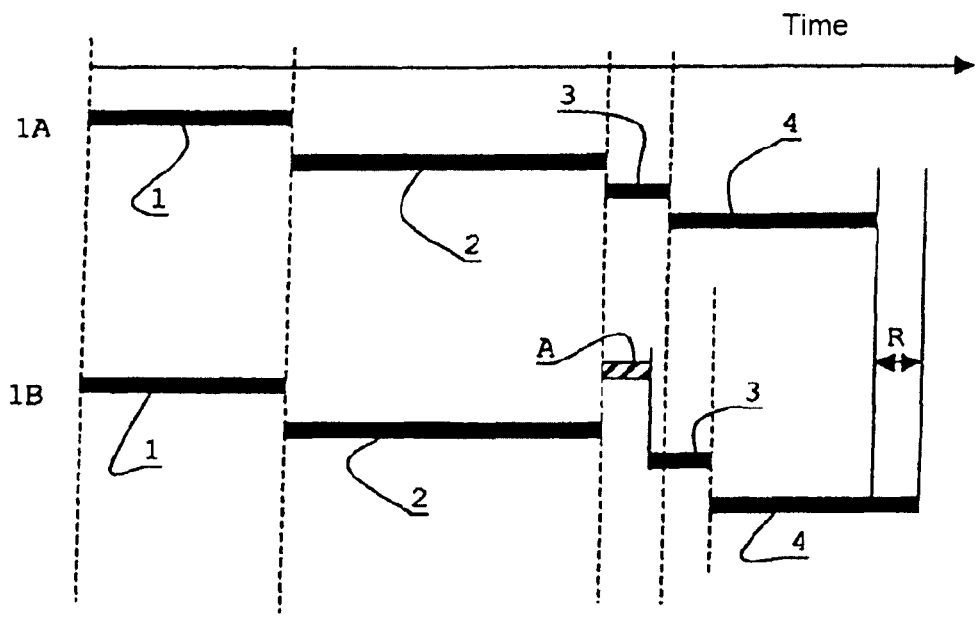

| | | | |
|---|---|---|---|
| 6,047,165 A | 4/2000 | Wright et al. | |
| 6,104,914 A | 8/2000 | Wright et al. | |
| 6,108,523 A | 8/2000 | Wright et al. | |
| 6,154,637 A | 11/2000 | Wright et al. | |
| 6,308,045 B1 | 10/2001 | Wright et al. | |
| 6,650,974 B2* | 11/2003 | Chamas et al. | 701/5 |
| 7,426,388 B1 | 9/2008 | Wright et al. | |
| 7,444,146 B1 | 10/2008 | Wright et al. | |
| 8,306,685 B2* | 11/2012 | Yukawa et al. | 701/31.4 |
| 2001/0032103 A1* | 10/2001 | Sinex | 705/4 |
| 2002/0018008 A1 | 2/2002 | Wright et al. | |
| 2002/0055816 A1* | 5/2002 | Chamas et al. | 701/124 |
| 2003/0109973 A1* | 6/2003 | Hensey et al. | 701/35 |
| 2003/0148735 A1 | 8/2003 | Wright et al. | |
| 2003/0148736 A1 | 8/2003 | Wright et al. | |
| 2004/0267412 A1* | 12/2004 | Arnouse | 701/2 |
| 2006/0025900 A1* | 2/2006 | Arnouse | 701/10 |
| 2006/0111931 A1* | 5/2006 | Johnson et al. | 705/1 |
| 2006/0157619 A1* | 7/2006 | Cordina et al. | 244/118.5 |
| 2006/0183474 A1* | 8/2006 | Ziarno et al. | 455/431 |
| 2006/0252422 A1* | 11/2006 | Kauffman et al. | 455/431 |
| 2007/0060063 A1 | 3/2007 | Wright et al. | |
| 2007/0112479 A1 | 5/2007 | Wright et al. | |
| 2007/0156296 A1 | 7/2007 | Wright et al. | |
| 2008/0010005 A1* | 1/2008 | Small et al. | 701/120 |
| 2008/0070517 A1 | 3/2008 | Brady et al. | |
| 2008/0140266 A1* | 6/2008 | Stefani | 701/3 |
| 2008/0215408 A1* | 9/2008 | Pachon et al. | 705/8 |
| 2008/0312776 A1* | 12/2008 | Sylvester | 701/3 |
| 2009/0018713 A1* | 1/2009 | Coulmeau et al. | 701/3 |
| 2009/0233597 A1 | 9/2009 | Wright et al. | |
| 2010/0036547 A1* | 2/2010 | Myers et al. | 701/3 |

OTHER PUBLICATIONS

Sampigethaya, K. et al., "Secure Wireless Collection And Distribution Of Commercial Airplane Health Data", IEEE/AIAA 26$^{th}$ Digital Avionics Systems Conference, pp. 4.E. 6-1-4.E.6-8, XP002524531, ISBN: 978-1-4244-1108-5, (Oct. 21-25, 2007).

International Search Report issued Mar. 11, 2010 in PCT/FR09/000990 filed Aug. 7, 2009.

* cited by examiner

DEVICE FOR COMMUNICATING BETWEEN AIRCRAFT FLIGHT PERSONNEL AND THE GROUND, AND METHOD IMPLEMENTING SAID DEVICE

The invention belongs to the field of systems for communication between an aircraft and a base on the ground. More particularly, the invention relates to a system for communication between a commercial aircraft and the base of the airline company having chartered it when the said aircraft itself is on the ground during the phases of flight preparation or the phases of flight closing. The invention also relates to a method implementing such a system for communication by the commercial flight personnel and/or the captain of the aircraft for preparation of a flight and the phase of flight closing and unloading of the commercial cargo.

The use for a commercial flight of an aircraft served by a captain and a cabin crew comprises steps for preparation and closing of the flight. These steps have as an object to ensure the transport of the commercial cargo and/or the passengers under economical conditions of optimal safety. Since the flight is under the responsibility of the captain, regulations require the approval with signature by the latter of all documents relating to the safety of the flight, and the guarantee that these documents were effectively received by the ground.

The tasks taking place when the aircraft is on the ground prior to take-off and after landing are particularly critical, since they affect the turn-around time of the aircraft during stopover and may bring about a departure delay.

A few hours prior to the flight, the captain, who is the individual in charge of the flight, receives during a meeting which is held in a room referred to as briefing room, a complete technical documentation on the flight, called "flight record" in the remainder of the document. This documentation comprises documents such as the flight plan, the route, the weather forecast, the navigation charts, the NOTAMs and the company procedures. All this documentation is received by the captain who, when necessary, signs certain documents in order to accept them. The flight and cabin crew generally is gathered in the briefing room and is introduced, as are the anticipated flight conditions. On the occasion of this flight preparation meeting, the captain checks with the purser (cabin chief) that all the procedures relating to management of the passengers are complete and implemented.

After this flight preparation in the briefing room, the captain—and the rest of the crew—goes back to the aircraft. The flight record is brought on board.

On board the aircraft, the flight crew continues the flight preparation. During this on-board preparation phase, documents from the flight record are completed and updated in order to validate and confirm the configuration of the airplane and its departure conditions.

By way of non-limitative example, there is cited here as a document completed on board the document known under the name of NOTOC. The latter is used to inform the captain about the cargo of the aircraft and indicates all the potentially hazardous materials that are on board, as well as any special load in the aircraft.

At present, a ground staff comes to look for the documents (such as the NOTOC) which are duly signed by the captain in order to bring them back to the ground for filing purposes. These documents are regulatory and regulations require an authentication with signature of the individual in charge of the flight prior to departure. Moreover, the data contained in these documents must be transferred to the ground prior to the departure of the aircraft. The regulatory documents (to be signed by the captain) are prepared in two copies, one which remains on board and the other which is to remain on the ground.

Once the documents are duly completed and authenticated, it therefore is necessary to wait to hand them over to an individual remaining on the ground.

Besides the fact that this regulatory procedure may take time and delay the departure of the aircraft, this procedure is costly since it makes it necessary to call upon an individual to receive the documents signed by the captain and/or the purser.

Certain tasks generally are allotted to the cabin crew. These may be grouped in various phases and three critical phases may be identified. It is a matter of phases relating to:

tasks making use of the cabin crew prior to loading of the commercial cargo, these tasks comprising:
a. check-in of the cabin crew
b. communication to this personnel of information items about the development of the flight
c. assignment of tasks to the members of the cabin crew
d. preparation of the cabin tasks making use of the cabin crew during and after loading of the commercial cargo or boarding of the passengers but prior to take-off:
e. inventory of the commercial cargo or the counting of the passengers and the verification of agreement with the list provided by the airline company. This agreement allows departure of the airplane from its parking point tasks being performed after landing of the aircraft:
f. it is a matter of drawing up and handing over the cabin flight report which specifies the development of the flight in the cabin and the possible incidents. This report is validated by the captain. If need be, the analysis of this report brings about actions for maintenance of the cabin which must be taken prior to a new turn-around of the aircraft According to the prior art, steps (a) to (c) take place on the ground in the airport, generally in a room referred to as "briefing" room. The cabin crew meets in this room prior to boarding, checks in and is informed there of information items relating to the development of the flight. The individual in charge of the cabin crew, or "purser," becomes acquainted with the crew, verifies the agreement between the personnel list and the personnel actually present and assigns responsibilities thereto. If need be, he reports observations relating to the members of the crew to the airline company. Following these steps, the cabin crew boards the aircraft and prepares the cabin.

According to this method of the prior art, if there is not agreement between the personnel list and the personnel actually present, for example, a member of the crew is missing or if one of these members does not correspond to the list, the cabin crew waits in the briefing room until the problem is resolved prior to boarding. Thus in the event of absence of a member of the crew, the purser so informs the airline company which will ascertain the reasons for absence of the member in question prior to assigning a new member if need be and creating a new personnel list which will have to be validated again prior to boarding of the personnel. All this delays preparation of the cabin even though almost the entire cabin crew is present and could have begun this task, despite the absence of one of its members.

Similarly, during step (e), a late change for example in the number of passengers requires the door of the aircraft to remain open in order to communicate with the ground personnel when the new list is transmitted, the detailed count is performed and the agreement of this detailed count with the list is confirmed. This delays the startup of the plane accordingly.

Thus, according to the prior art, the various tasks follow from each other sequentially and therefore are all on a critical path, that is to say that the slightest delay on one of these tasks fully affects the turn-around time of the aircraft. As it happens, in nearly all of these cases, these delays are related to minor events such as commonplace lateness of members of the crew or correspondingly for the passengers.

A need therefore exists to align these various tasks carried out by the flight crew as well as by the cabin crew so that they can tolerate some performance delays without significantly changing the turn-around time of the aircraft but while ensuring a comparable safety level which remains in compliance with the operational regulations for commercial airplane fleets.

In order to meet this need, the invention proposes a communication system for an aircraft comprising a cockpit and a cabin served by a crew comprising a captain and a cabin crew, the said system being able to receive and send information items in digitized or digitalized form from an information network on the ground. According to this invention, this system further includes at least one device for display of these information items in the aircraft.

In this way the airline company may transfer complex information items into the aircraft, to the captain and if need be to the cabin crew. Such complex information items are, for example, documents to be validated and/or signed, charts or images, that is to say information items which, generally speaking, may not be transmitted verbally either technically or by reason of the length of such a verbal message.

In such a communication system, a display device may be for the attention of the captain and be disposed in the cockpit of the aircraft. In addition or as a variant, a display device for the attention of the cabin crew and disposed in the cabin of the aircraft may be provided.

Such a communication system advantageously further comprises a device able to capture information items and send these information items to the network on the ground. In this way it is possible to establish a dialogue relating to complex information items between the airline company and the personnel of the aircraft (flight crew and/or cabin crew) while the latter is inside the aircraft, door closed as the case may be.

A communication system advantageously further comprises inside the aircraft a device for saving information items transmitted by the ground and information items captured by the cabin crew. Such a communication system allows the cabin crew to capture the flight report during cruising, save it and send it to the ground once the communication system is connected with the network of the airline company.

A communication system that is the object of the invention also comprises, in a preferential embodiment, a digital signature device. Such a digital signature device allows the captain to validate any type of report relating to the flight. Such a digital signature device advantageously is a mobile terminal which then allows the cabin crew to present the cabin flight report to the captain for signature without his having to be disturbed. The report thus validated by the digital signature then is transmitted to the airline company through the communication system.

This invention also relates to a flight preparation method for an aircraft comprising a communication system according to this invention and including the following steps:
(i) sending information items necessary to the flight on board the aircraft
(ii) communicating to the cabin crew and to the captain the information items necessary to the departure of the airplane and to the flight, by virtue of the communication system
(iii) approving the received documents and validating them electronically with the captain
(iv) updating and sending back to the ground the list of documents necessary to authorization for departure of the flight
(v) receiving an acknowledgment of receipt from the ground making it possible to confirm that the conditions for departure of the flight effectively were received and recorded by the ground.

This invention also relates to a flight preparation method for an aircraft comprising a communication system of the type of those described above, including the following steps:
(vi) reception by the captain of documents in digital form and display thereof on a display device in the cockpit of the aircraft,
(vii) validating and/or completing and/or modifying the information items contained in the documents received in digital form,
(viii) validating by the captain of the aircraft, by means of the digital signature device, documents possibly modified and/or completed,
(ix) sending the possibly modified and/or completed documents via the sending device to the network on the ground,
(x) reception of an acknowledgment of receipt by the network on the ground of the documents sent.

Such methods make it possible to avoid calling upon an individual to take the documents signed by the captain to the ground, while being certain, on board the aircraft, that the transmitted documents effectively are on the ground when the aircraft leaves.

Each of thee methods moreover may further comprise steps consisting in:
(xi) checking in the members of the cabin crew present
(xii) communicating to the cabin crew, via the communication system, information items relating to the development of the flight
(xiii) assigning tasks to the members of the cabin crew according to the information items received from the communication system
(xiv) preparing the cabin of the aircraft for the flight according to the information items received via the communication system
such that steps (xi) to (xiii) are performed in the cabin of the aircraft by the entire cabin crew present.

Since in this way the check-in and briefing phases may take place while the cabin crew already is inside the aircraft, it may start the task of preparation of the cabin despite minor uncertainties on the list or the presence of the cabin crew. For example, if a member of the crew is missing, the purser may so inform the airline company via the communication system and wait for the response of the said company on the display terminal situated in the cabin, then receive a new list via the communication system, the said list containing a substitute member, which list will be validated by the captain also from the capture terminal upon the arrival of this replacement member in the aircraft. This document, validated and signed by the captain, may be sent back to the ground for validation and formal acceptance by the captain. If the procedure of the airline company so requires, an acknowledgement of receipt may be sent by the ground personnel of the airline company to the captain in order to approve the departure of the airplane with a new crew list. Meanwhile the cabin crew was able to organize the preparation of the cabin with the members present and thus prevent the lateness of personnel or the exchange of a form from affecting the turn-around time or calling upon ground personnel.

A method described above advantageously also comprises a step consisting in:
(xv) communicating to the cabin crew information items about the commercial cargo after loading thereof and closing of the door of the aircraft.

Thus in the case of an aircraft intended for the transport of passengers, the door of the aircraft is closed upon the end of loading, and the count operations may start immediately, without waiting for the updating of a late change in the number of passengers which may be sent to the cabin crew via the communication system. In this way the personnel may have available an updated image of the occupancy of the aircraft and thus locate the missing or additional passengers more rapidly.

These characteristics of the invention make it possible to reduce the impact on turn-around time of the uncertainties occurring prior to or during loading of the commercial cargo of the aircraft. A method that is the object of the invention advantageously further comprises a step consisting in:
(xvi) transmitting to the information network on the ground a cabin flight report after landing (and possibly prior to opening of the doors) of the aircraft.

Transmission of this report may be accomplished by the cabin crew when the communication system comprises a capture terminal available thereto in the cabin. In this way the various needs for maintenance, cleaning or assistance may be transmitted to the airline company upon arrival of the aircraft at its parking point in the airport even prior to opening of the doors and the initial contact with the ground personnel, which saves time with regard to unloading and preparation of the cabin for the next flight. According to the nature of the flight, it may be necessary for the cabin flight report to be validated by the captain.

A variant of this method provides that it also comprises the following steps:
(xvii) communicating to the crew information items about the departure configuration of the airplane after boarding of the passengers and loading of the commercial cargo and closing of the door of the aircraft,
(xviii) attesting to the good reception by the crew of these new conditions at the time of the departure procedure.

This invention will be better understood with the aid of the description that follows, provided with reference to the attached schematic drawings, and describing forms of implementation of this invention by way of non-limitative illustration.

Figure 2:
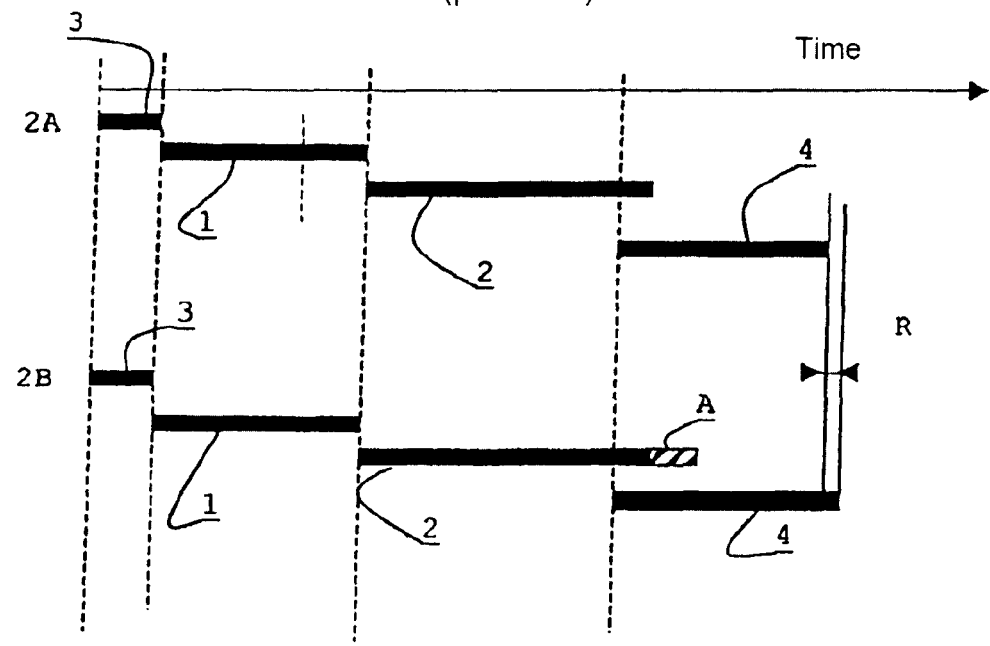

FIG. 1 shows a chronogram of the tasks necessary to preparation of a commercial flight by the cabin crew, in a rated situation (1A) and in the presence of an uncertainty (1B), and FIG. 2 shows the chronogram corresponding to the same tasks by the method according to the invention, according to a rated situation (2A) and in the presence of an uncertainty (2B).

According to a first embodiment of the invention, a communication system comprises a station on the ground referred to as "dispatcher" situated on the premises of the airline company chartering a commercial flight and comprising an information network connecting the dispatcher station with the corresponding aircraft.

This communication post is in radio link with an aircraft that is to make a commercial flight. This aircraft comprises a cockpit and a cabin. It is served by a flight crew comprising in particular a captain, who is in charge of the flight, and a cabin crew. The cockpit is intended to accommodate the flight crew during the flight, while the cabin accommodates passengers and the cabin crew.

The radio link may be implemented on an identified frequency specific to the airline company, or on a set frequency for all the companies present in the airport. Such a link does not allow transmission of digital, digitized or digitalized data of significant size. It allows only an exchange of a data packet of limited size comparable, for example, to an SMS.

This invention here proposes using another means of communication such as a link via the mobile telephony network which is almost always present in an airport, or else via a Wifi network. The link also may be wired with connection from the airplane to the ground network via an Ethernet connector situated in the airplane.

In any case, the connection is implemented according to a protocol including the sending by the dispatcher of an addressing signal identifying the receiver of the information, and access to the information on board is guaranteed confidential and accessible only by the captain who then may delegate access to the purser, for example. The link implemented preferably is a secured interactive link, such as, for example, a link known under the name of VPN link. This link preferably also is a link making it possible to provide a real-time connection between the ground and the aircraft.

According to one embodiment, the signal transmitted in this way by the dispatcher is received directly by the aircraft which comprises a reception device able to implement the appropriate communication protocol. According to an alternative embodiment, the signal from the dispatcher is received by a communication module situated on the ground near the aircraft and which comprises means for reception and implementation of the communication protocol with the dispatcher. This communication module is itself in digital link with the aircraft via any appropriate means such as a wired link or an infrared light or laser link.

According to another embodiment, the dispatcher is in communication directly with the plane through a wired network. Several modes of communication may be contemplated for different aircraft of the same company in the same airport according to the parking point of the aircraft.

The information items transmitted by the dispatcher are displayed by the captain in the cockpit and/or by the cabin crew on display means such as, for example, a video monitor situated in the cockpit, another being able to be provided in the cabin. Advantageously, for an aircraft transporting passengers, the latter monitor preferably is installed in an area reserved for the crew such as the galley area. Advantageously, the said monitors may be retracted and stored away for the flight phases during which they are not used.

In order to allow the capture of information items by the captain and/or the cabin crew, each monitor is provided, for example, with a touch screen allowing its user to perform selections and validation according to a defined series of menus. Alternatively, the capture of information items by the user is accomplished through a keyboard and/or a pointing device such as a mouse.

According to an alternative embodiment, the display and capture devices described above may be replaced by a portable microcomputer that is connected to a network connector inside the aircraft.

In a preferred embodiment of this invention, the communication system comprises inside the aircraft a device allowing capture of a digital signature. This device enables the captain to validate various documents such as, for example, the flight report. The digital signature device may be integrated into the microcomputer when the display and capture terminal consists of such a computer, it may consist of a separate element, such as a magnetic identification card or smart-card type reader, or even a digital tablet making it possible to capture a signature in graphical form with the aid of a stylet or the capture of a confidential code.

The communication system advantageously further comprises a saving device inside the aircraft. This saving device may consist of a hard disk or memory cards. It may be a matter of the hard disk of the portable microcomputer when the display and capture terminal inside the aircraft consists of such a computer.

This invention relates in particular to an exchange of technical information items. In fact it may be applied to both the technical documentation and the commercial documentation which, in the prior state of the art was entrusted to the flight crew, and more particularly to the individual in charge of the flight, or the captain, during a meeting in a room on the ground belonging to the airline company chartering the aircraft. This documentation is collected in a record hereinafter called flight record.

This invention thus provides for the transfer of the flight record (the technical information intended for the flight crew—generally the captain and his second in command—as well as the information items intended for the cabin crew) in authenticated and secured manner on board the aircraft in digital form.

In this way, it is even conceivable not to go to the meeting room, also called briefing room, prior to entering the aircraft, for the flight crew as well as for the cabin crew.

As described above, the communication system comprises display means as well as a man-machine interface making it possible to complete the documents of the flight record in the cockpit and/or in the cabin of the aircraft. These documents may be graphics (charts, ground images, weather images), digital documents (forms, check-off lists, xml viewer), texts, reports to be filled out or digitized documents (pdf format).

These documents, completed if need be, then must be signed and sent back to the ground. Signature and sending to the ground may be accomplished with the aid of means already described above.

Once the signed documents are sent, it also is provided to receive an acknowledgment of receipt via the same communication system between the aircraft and the ground. In this way, the station on the ground may confirm full receipt of the documents. The captain, as provided by the regulations, then is assured that the documents effectively are on the ground prior to departure of the aircraft.

In this way it is possible for the ground personnel to update the flight data at the last moment without having to involve an individual who takes a document to the captain to have him sign for acceptance. According to the invention, the document updated at the last minute is sent in digital form, the captain accepts it and signs (or authenticates) it electronically and sends it back to the post on the ground by virtue of the link described above. The acknowledgment of receipt received by the captain from the station on the ground assures him that his acceptance effectively was received and is on the ground. A similar procedure also is implemented, for example, for the validation of a repair of a breakdown on board the aircraft.

The departure procedure for the flight therefore on the one hand is simplified and accelerated and on the other hand less costly, because it is not necessary to involve a ground staffer serving as messenger between the ground and the aircraft.

This invention also proposes a method for flight preparation, relating in particular to the cabin personnel, with the following steps:

(i) checking in the members of the cabin crew present (ii) communicating to the cabin crew, via the communication system, information items relating to the development of the flight (iii) assigning tasks to the members of the cabin crew according to the information items received from the communication system (iv) preparing the cabin of the aircraft for the flight according to the information items received via the communication system (v) communicating to the cabin crew information items about the commercial cargo after loading thereof and the closing of the door of the aircraft (vi) allowing the cabin crew to request validation by the captain of new cabin conditions, then, if need be, to send back the signed and validated information item to the dispatcher on the ground.

Alternatively, in case of breakdown of networks or in the absence of appropriate equipment in the airport, the method may be implemented at least for steps (i) to (iv) and (vi) by means of physical mediums such as compact disks (CDROM), random access memories provided with a connection interface such as "USB keys" or memory cards on which the appropriate information items are stored. Consequently the airline company using the flight preparation method according to the invention no longer needs to have a briefing room for the cabin crew.

In any case, the information items exchanged through the communication system preferably go through in encrypted form to prevent any malicious eavesdropping or any abuse of these information items.

The communication system described above makes it possible to implement the first four steps of the method for commercial flight preparation, according to the invention, with the cabin crew.

FIGS. 1 and 2 show respectively chronograms of tasks performed by the cabin crew according to the prior art and according to the invention.

According to the invention, the preparation method begins with step (3) of boarding of the crew onto the aircraft. For this purpose the dispatcher sends via the communication system the flight record including the commercial data which are displayed on the display device in the cockpit and/or in the cabin, if need be.

With the aid of the capture terminal, the purser ticks off the list in question so as to check in the personnel present. Alternatively the capture device may comprise a terminal for electronic reading of identification documents, such as magnetic badges or smart cards worn by the cabin crew, who then may be checked in individually in a secure manner during a step (1). This step (1) of check-in of the personnel therefore takes place in the aircraft, the latter being parked under power at its point for loading commercial cargo or boarding passengers. It comprises sequences consisting in:

receiving the list of the cabin crew from the dispatcher via the communication system recording the crew present, either by ticking off the list or through an individual identification system verifying agreement of the list with the personnel actually present and if necessary annotating the said list by means of the capture terminal sending back the list so annotated to the dispatcher via the communication system upon reception of the list so annotated, the dispatcher may, if need be, contact a reserve staffer in the event of absence of a member For its part, the cabin crew goes directly to a briefing step (2) which consists in communicating to the said personnel information items relating to the development of the flight, this without waiting for the replacement personnel. For this purpose, the purser receives from the dispatcher, still through the communication system, a set of information items relating to the cabin and to the flight in the form of a cabin information file. These information items are, for example, the type of aircraft, the flight number, the estimated flight time, etc. He also receives from the dispatcher information items relating to the configuration of the cabin and finally, if necessary, an updated list of the cabin crew, with relevant information items concerning members of the crew, including a possible member contacted to compensate for an absence and who has not yet reached this stage of the procedure.

The purser gathers the cabin crew present around the display point and communicates these information items thereto. He also distributes the commercial responsibilities and the responsibilities relating to safety to each of the members according to his particular skills.

The cabin crew then may begin a step of preparation of the cabin (4). During this time the replacement personnel may arrive and check in. The complete list of the cabin crew is sent to the dispatcher via the communication system.

The purser, with the aid of the display device, undertakes the briefing of the personnel who arrived late. Alternatively, the said personnel may be informed of these information items by virtue of the communication system.

Preparation of the cabin also is facilitated by the traceability of information items that such a digital communication system allows.

In fact, the cabin crew may capture all the relevant information items relating to the cabin and to its preparation, in particular any problem relating to maintenance. These information items are captured by means of the capture terminal in a digital logbook ("digital logbook") which thus is immediately available on the company network. In the same way, the cabin crew is immediately informed of any problem relating to preparation of the cabin, for example about everything that relates to maintenance of the cabin or catering for the passengers, and thus may more easily foresee these difficulties.

The cabin information file according to the invention typically contains:

information items about the flight
identification of the members of the crew of the aircraft
commercial information items (catering, duty-free goods sold in the cabin, service planning, . . . ), information items about the commercial cargo in the hold
information items relating to maintenance of the cabin
information items about the passengers (passenger list)
information items relating to the safety and security of the flight
individual information items about members of the crew
a reminder of the tasks to be performed in flight
specific safety information items (turbulence, evacuation, etc. . . . )
specific airline-company information items Thus the possibility of aligning a part of the check-in and briefing tasks makes it possible to perform flight preparation in a shorter time in comparison with the solution of the prior art (FIG. 1). Moreover, in the presence of an uncertainty of duration A, the delay R caused by this uncertainty in the preparation cycle is less than A.

At the end of preparation of the cabin, loading of the commercial cargo may begin.

When loading is finished, the doors are closed.

The communication system according to the invention makes it possible to send the update of the passenger list to the cabin crew.

The report is captured by the purser on the capture terminal, advantageously from a model or from a form to be filled out.

The purser, or another member of the cabin crew, may capture his flight report generally toward the end of cruising or if necessary during cruising in the event of an exceptional incident and save it on the saving device.

According to one embodiment:

The report is transmitted directly into the cockpit to the attention of the captain, when the aircraft has an internal data-processing network The report was captured on a microcomputer that further comprises digital signature means, and the purser presents the report to the captain for signature on the said microcomputer The report is transferred to a special terminal able to display the said report and receive the digital signature. In this case, the purser also presents the report to the captain for validation.

The captain validates the report either by capture of a specific information item: secret code or digitized graphical signature, or through a personal card.

Once the flight report is validated by the digital signature, it no longer may be modified. The communication system also comprises software safeguards that prevent any transmission of a flight report not validated by a digital signature The flight report is transmitted to the dispatcher directly from the aircraft, by wired, radio or optical link when the aircraft is at its parking point, either directly between the aircraft and the network on the ground or through a communication module.

As is thus apparent from the procedures described above, this invention makes it possible to accelerate the departure procedure for a flight with respect to both the flight crew and the cabin crew.

This invention, however, is not limited to the described communication system and its variants, nor to the contemplated methods and their variants, but to all the embodiment variants of this system and these methods within the reach of the individual skilled in the art in the context of the claims below.

The invention claimed is:

1. A communication system for an aircraft that includes a cockpit and a cabin served by a crew including a captain and a cabin crew, the communication system comprising:

a capture device on board the aircraft configured to receive as input flight preparation information corresponding to information related to a flight prior to departure of the aircraft, the flight preparation information including check-in information indicating a presence on board the aircraft of members of the cabin crew;

a communication device on board the aircraft configured to send and receive information items in one of digitized and digitalized form to and from an information network on the ground, and configured to send the flight preparation information, which includes the check-in information indicating the presence on board the aircraft of the members of the cabin crew, received as input by the capture device on board the aircraft, to the information network on the ground;

a first display device disposed in the cockpit of the aircraft and configured to display the information items; and a second display device disposed in the cabin of the aircraft and configured to display the information items, which are also displayed by the first display device disposed in the cockpit of the aircraft, and display, in response to a member of the cabin crew being absent, a message from the information network on the ground regarding a new member that is a potential replacement for the absent member of the cabin crew.

2. The communication system for an aircraft according to claim 1, wherein the first display device is for attention of the captain.

3. The communication system for an aircraft according to claim 1, wherein the second display device is for attention of the cabin crew.

4. The communication system according to claim 1, further comprising a device for saving the information items.

5. The communication system according to claim 1, further comprising a digital signature device.

6. The communication system according to claim 5, wherein the digital signature device is a mobile terminal.

7. The communication system for an aircraft according to claim 1, wherein
the capture device on board the aircraft is configured to generate a check-in list based on the check-in information, and
the communication device on board the aircraft is configured to send the check-in list to the information network on the ground.

8. The communication system for an aircraft according to claim 7, wherein
the information items received by the communication device on board the aircraft include information on a type of the aircraft, a flight number, estimated flight time, and configuration of the cabin.

9. A flight preparation method for an aircraft that includes a communication system, which includes a capture device, a communication device, a first display device, and a second display device, the aircraft including a cockpit and a cabin served by a crew including a captain and a cabin crew, the flight preparation method comprising:

receiving as input, by the capture device on board the aircraft, flight preparation information, the flight preparation information including check-in information indicating a presence on board the aircraft of members of the cabin crew;

sending, by the communication device, the flight preparation information, received as input on board the aircraft by the capture device, to the information network on the ground;

receiving on board the aircraft, from the information network on the ground, information items necessary to a flight of the aircraft, the information items including documents;

communicating to the captain and the cabin crew, via the communication device, the information items necessary to the flight;

displaying, by the first display device disposed in the cockpit of the aircraft, the information items;

displaying, by the second display device disposed in the cabin of the aircraft, the information items, which are also displayed by the first display device disposed in the cockpit of the aircraft, and displaying, in response to a member of the cabin crew being absent, a message from the information network on the around regarding a new member that is a potential replacement for the absent member of the cabin crew;

approving the documents and validating the documents electronically by the captain;

updating and sending back to the information network on the ground a list of documents necessary for authorization for departure of the flight; and receiving an acknowledgment of receipt from the information network on the ground to confirm that conditions for departure of the flight effectively were received and recorded by the information network on the ground.

10. The flight preparation method for an aircraft according to claim 9, further comprising:
communicating to the cabin crew information items relating to development of the flight for the communication device;
assigning tasks to the members of the cabin crew according to information items received from the communication device;
preparing the cabin of the aircraft for the flight according to information items received via the communication device; and
performing the communicating, the assigning, and the preparing in the cabin of the aircraft by the entire cabin crew present.

11. The flight preparation method for an aircraft according to claim 9, further comprising:
communicating to the cabin crew information items about commercial cargo after loading thereof and closing doors of the aircraft.

12. The method according to claim 9, further comprising:
transmitting an approved flight report to the information network on the ground after landing of the aircraft.

13. The method according to claim 12, wherein the flight report is validated by the captain of the aircraft by a digital signature device prior to the transmitting.

14. The method according to claim 13, further comprising:
communicating to the crew information items about a departure configuration of the aircraft after boarding of the passengers and loading of commercial cargo and closing a door of the aircraft; and
attesting to a good reception by the crew of the new conditions during a departure procedure.

15. A flight preparation method for an aircraft that includes a communication system, which includes a capture device, a communication device, a first display device, a second display device, and a digital signature device, the aircraft including a cockpit and a cabin served by a crew including a captain and a cabin crew, the flight preparation method comprising:
receiving as input, by the capture device on board the aircraft, flight preparation information, the flight preparation information including check-in information indicating a presence on board the aircraft of members of the cabin crew;

sending, by the communication device, the flight preparation information, received as input on board the aircraft by the capture device, to the information network on the ground;

receiving by the captain on board the aircraft, from the information network on the ground, documents in digital form;

displaying, by the first display device disposed in the cockpit of the aircraft, information items contained in the documents received in digital form;

displaying, by the second display device disposed in the cabin of the aircraft, information items, which are also displayed by the first display device disposed in the cockpit of the aircraft, and displaying, in response to a member of the cabin crew being absent, a message from the information network on the ground regarding a new member that is a potential replacement for the absent member of the cabin crew;

at least one of validating, completing, and modifying the information items;

validating by the captain, by the digital signature device, documents that are at least one of modified and completed;

sending the at least one of modified and completed documents via the communication device to the information network on the ground; and receiving an acknowledgment of receipt from the information network on the ground for the documents sent.

* * * * *